April 29, 1947.   C. MASON   2,419,688
FRUIT JUICE EXTRACTOR
Filed Aug. 15, 1944
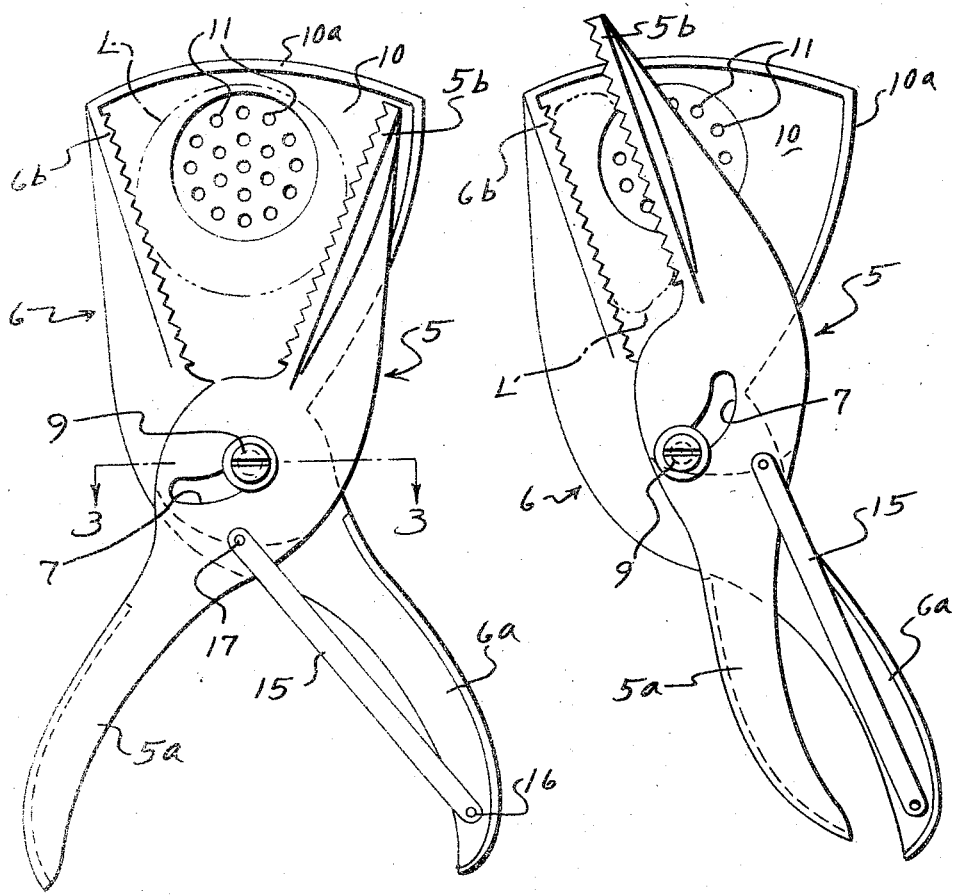
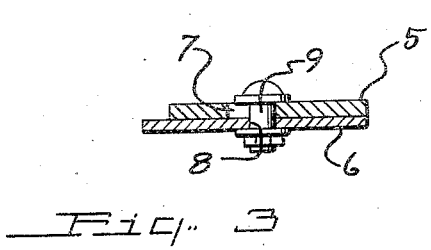
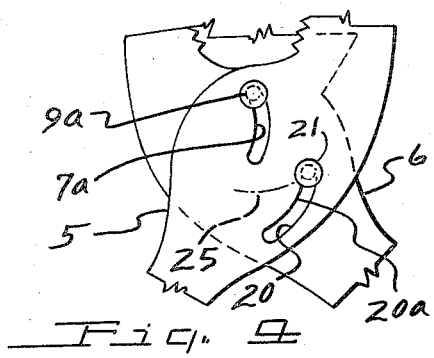
*INVENTOR*

Patented Apr. 29, 1947

2,419,688

UNITED STATES PATENT OFFICE 2,419,688

FRUIT JUICE EXTRACTOR

Collins Mason, Beverly Hills, Calif.

Application August 15, 1944, Serial No. 549,515

10 Claims. (Cl. 100—41)

My invention has to do with fruit juice extractors. More particularly, the invention relates to improvements in that type of extractor which accomplishes the juice extraction by squeezing or pressing the fruit between two jaws.

Conventional extractors of this type utilize a pliers-like action which merely squeezes the fruit between the jaws. This is inefficient in that such action does not extract the maximum amount of juice. This fact is readily demonstrated by taking a fruit section, such as half a lemon, which has been subjected to such a squeezing action, and rolling the fruit section between the fingers while at the same time pressing it between the fingers. It will be found that considerable additional juice may be extracted by such simultaneous rolling-squeezing action.

It is therefore among the objects of my invention to provide a juice extractor which operates simultaneously to subject the fruit to both a rolling and squeezing action.

In the presently preferred form of extractor by which I accomplish this purpose, I use a pair of pivotally connected, pliers-like jaws and provide what in effect is a floating fulcrum which acts to move the jaws longitudinally relative to each other in response to their movement towards and away from each other.

While, for explanatory purposes, I shall describe only two embodiments of the invention, it will be understood that, in its broader aspects as defined by the accompanying claims, the invention may be embodied in other physical forms differing from the specific adaptations now to be described. In connection with the following description I shall refer to the accompanying drawings, in which:

Fig. 1 is a plan view showing the device in open position;

Fig. 2 is a plan view showing the device in closed or pressure-applying position;

Fig. 3 is a section taken on line 3—3 of Fig. 1; and

Fig. 4 is a fragmentary plan view of another embodiment of the invention.

Referring now to the drawings, I show a pair of pliers-like levers 5, 6, having handle portions 5a, 6a and fruit-gripping jaw portions 5b, 6b.

Mounted in an opening 8 in member 6 there is a pivot pin 9 which passes through a slightly curved longitudinally disposed slot 7 in member 5, there being a washer interposed around the pin between the head portion thereof and the outer face of member 5 to retain the members 5, 6 in assembly.

In conventional manner, jaw portion 6b has integrally formed therewith a skirt 10 flanged at 10a and perforated at 11. This skirt is a fruit-supporting member; for instance half a lemon shown in dotted lines L, may be placed with its cut surface against the perforated skirt between the jaws. The bottom side edge portion of jaw 5b facing skirt 10 is upwardly curved towards its outer end sufficiently to clear the flange 10a during swinging of the jaw.

A substantially rigid link 15 is pivoted at 16 to handle portion 6a and is pivoted at 17 to member 5. Thus, inasmuch as the pivotal points 16, 17 are fixed relatively to the levers 5 and 6, as the handle portions 5a, 6a are swung relative to each other, the link, being rigid, causes the jaws to move longitudinally relative to each other. By virtue of this action, the lemon is rolled between the jaws at the same time it is being squeezed therebetween.

In the embodiment of Fig. 4 the parts are as before described except that the pivot pin 9a and slot 7a are placed closer to the jaw portions and instead of effecting the relative longitudinal movement of the jaws by means of the link 15 before described, I here utilize a curved slot 20 in member 5 into which projects a pin 21 carried by member 6. The slot 20 is disposed divergent to an arc denoted by dotted line 25 having the pin 9a as its axis, so that as the members 5, 6 are swung relative to each other the pin 21 slides against the wall 20a of slot 20 to cause the jaws, by such cam action, to move longitudinally relative to each other, the pin 9a moving along slot 7a.

I claim:

1. A fruit juice extractor comprising a pair of lever members, means pivotally and slidably connecting said members together for swinging and longitudinal movement relative to each other, means cooperating with said members to move them longitudinally relative to each other in response to said relative swinging movement, and fruit-retaining means carried by one of the lever members.

2. A fruit juice extractor comprising a pair of lever members disposed crosswise of each other for pliers-like, relative swinging movement, each of the lever members having a jaw portion at one end and a handle portion at its other end, means pivotally and slidably connecting the lever members together between their jaws and handle portions, means responsive to relative swinging movement of the lever members to move one of the jaws longitudinally relative to the other, and fruit-retaining means carried by the jaw portion of one of the lever members.

3. A fruit juice extractor comprising a pair of lever members disposed crosswise of each other for pliers-like, relative swinging movement, each of the lever members having a jaw portion at one end and a handle portion at its other end, means pivotally and slidably connecting the lever members together between their jaws and handle portions, and means responsive to relative swinging movement of the lever members to move one of the jaws longitudinally relative to the other, said last-named means comprising a rigid link normally disposed diagonally from one handle portion to the other and being pivotally connected at its respective ends to said respective handle portions.

4. A fruit juice extractor comprising a pair of lever members disposed crosswise of each other, a longitudinally disposed elongated slot in one of the lever members at a point spaced from its ends, a pivot pin carried by the other member and extending into said slot, link means extending diagonally between and pivotally secured at its respective ends to the respective lever members, and fruit-retaining means carried by an end portion of one of the lever members.

5. A fruit juice extractor comprising a pair of lever members disposed crosswise of each other, said members presenting opposed jaws adapted to receive a fruit portion therebetween, fruit-retaining means carried by one of the jaws, a slot in one of the lever members, a pivot pin carried by the other lever member and projecting into and being movable along said slot whereby to swingably connect the lever members together and permit one thereof to move longitudinally relative to the other, and means responsive to swinging movement of the lever members relative to each other to impose a longitudinal thrust upon one of the lever members in one direction and upon the other lever member in the opposite direction whereby to move the lever members longitudinally relative to each other.

6. A fruit juice extractor comprising a pair of lever members disposed crosswise of each other, said members presenting opposed jaws adapted to receive a fruit portion therebetween, fruit-retaining means carried by one of the jaws, a slot in one of the lever members, a pivot pin carried by the other lever member and projecting into and being movable along said slot whereby to swingably connect the lever members together and permit one thereof to move longitudinally relative to the other, and cam means responsive to swinging movement of the lever members relative to each other to impose a longitudinal thrust upon one of the lever members in one direction and upon the other lever member in the opposite direction whereby to move the lever members longitudinally relative to each other.

7. A fruit juice extractor comprising a pair of lever members disposed crosswise of each other, said members presenting opposed jaws adapted to receive a fruit portion therebetween, a slot in one of the lever members, a pivot pin carried by the other lever member and projecting into and being movable along said slot whereby to swingably connect the lever members together and permit one thereof to move longitudinally relative to the other, means responsive to swinging movement of the lever members relative to each other to impose a longitudinal thrust upon one of the lever members in one direction and upon the other lever member in the opposite direction whereby to move the lever members longitudinally relative to each other, and a perforated fruit-supporting skirt carried by one of the jaws and projecting laterally therefrom under and out of the path of movement of the other jaw.

8. A fruit juice extractor comprising a pair of lever members, means pivotally and slidably connecting said members together for swinging and longitudinal movement relative to each other, cam means cooperating with said members to move them longitudinally relative to each other in response to said relative swinging movement, and fruit-retaining means carried by an end portion of one of the lever members.

9. A fruit juice extractor comprising a pair of lever members disposed crosswise of each other for pliers-like, relative swinging movement, each of the lever members having a jaw portion at one end and a handle portion at its other end, a slot in the first of the lever members, a pivot pin carried by the second lever member and projecting into and being movable longitudinally of the slot, a second slot in the first lever member and a pin carried by the second lever member and projecting into and being movable longitudinally of the second slot, said second slot being disposed divergent to an arc having the pivot pin as its axis.

10. A fruit juice extractor comprising a pair of lever members, means pivotally and slidably connecting said members together for swinging and longitudinal movement relative to each other, means cooperating with said members to simultaneously move them longitudinally relative to each other in response to said relative swinging movement, and fruit-retaining means carried by an end portion of one of the lever members.

COLLINS MASON.

REFERENCES CITED

The following references are of record in the file of this patent:

UNITED STATES PATENTS

| Number | Name | Date |
|---|---|---|
| 1,386,149 | Allan | Aug. 2, 1921 |
| 980,628 | Gilchrist | Jan. 3, 1911 |
| 979,364 | Baudement et al. | Dec. 20, 1910 |
| 1,930,056 | Klingler | Oct. 10, 1933 |
| 611,537 | Ward | Sept. 27, 1898 |
| 1,710,929 | Kelleway | Apr. 30, 1929 |
| 537,458 | Hewlett | Apr. 16, 1895 |
| 1,918,889 | Bacon | July 18, 1933 |

FOREIGN PATENTS

| Number | Country | Date |
|---|---|---|
| 462,711 | Germany | July 16, 1928 |